United States Patent [19]

Solomonides

[11] Patent Number: 4,673,147
[45] Date of Patent: Jun. 16, 1987

[54] PROGRAMMABLE EJECTION SEAT SYSTEM

[75] Inventor: Byron C. Solomonides, Columbus, Ohio

[73] Assignee: Rockwell International Corporation, El Segundo, Calif.

[21] Appl. No.: 703,974

[22] Filed: Feb. 21, 1985

[51] Int. Cl.⁴ .......................................... B64D 25/10
[52] U.S. Cl. ........................ 244/122 A; 244/122 AB; 244/141; 244/122 AE
[58] Field of Search ..... 244/122 A, 122 AB, 122 AC, 244/122 AD, 122 AE, 141

[56] References Cited

U.S. PATENT DOCUMENTS

| | | | |
|---|---|---|---|
| 2,693,326 | 11/1954 | Lobelle | 244/122 AE |
| 2,996,272 | 8/1961 | Stott et al. | 244/122 AD |
| 3,027,125 | 3/1962 | Fulton | 244/122 AD |
| 3,180,593 | 4/1965 | Martin | 244/122 AE |
| 4,303,212 | 1/1981 | Stone et al. | 244/122 AD |
| 4,399,968 | 8/1983 | Stock et al. | 244/137 R |

FOREIGN PATENT DOCUMENTS

| | | | |
|---|---|---|---|
| 753996 | 3/1967 | Canada | 244/122 A |
| 1217161 | 12/1970 | United Kingdom | 244/122 A |

*Primary Examiner*—Joseph F. Peters, Jr.
*Assistant Examiner*—Lynn M. Fiorito
*Attorney, Agent, or Firm*—Charles T. Silberberg

[57] ABSTRACT

A programmable crewmember emergency ejection system is disclosed which will eject the crewmember expeditiously from a disabled aircraft, while at the same time assuring that the crewmember will not be subjected to forces that are beyond crewmember tolerance. This is accomplished by a control system involving sensors having signals that are processed and used to vary ejection thrust and acceleration onset rate. The system involves a two phase ejection: A catapult phase followed by a rocket phase, both phases cooperating to provide a substantially constant maximum thrust that is well within human tolerances such that a second jolt to the crewmember is substantially minimized.

27 Claims, 6 Drawing Figures

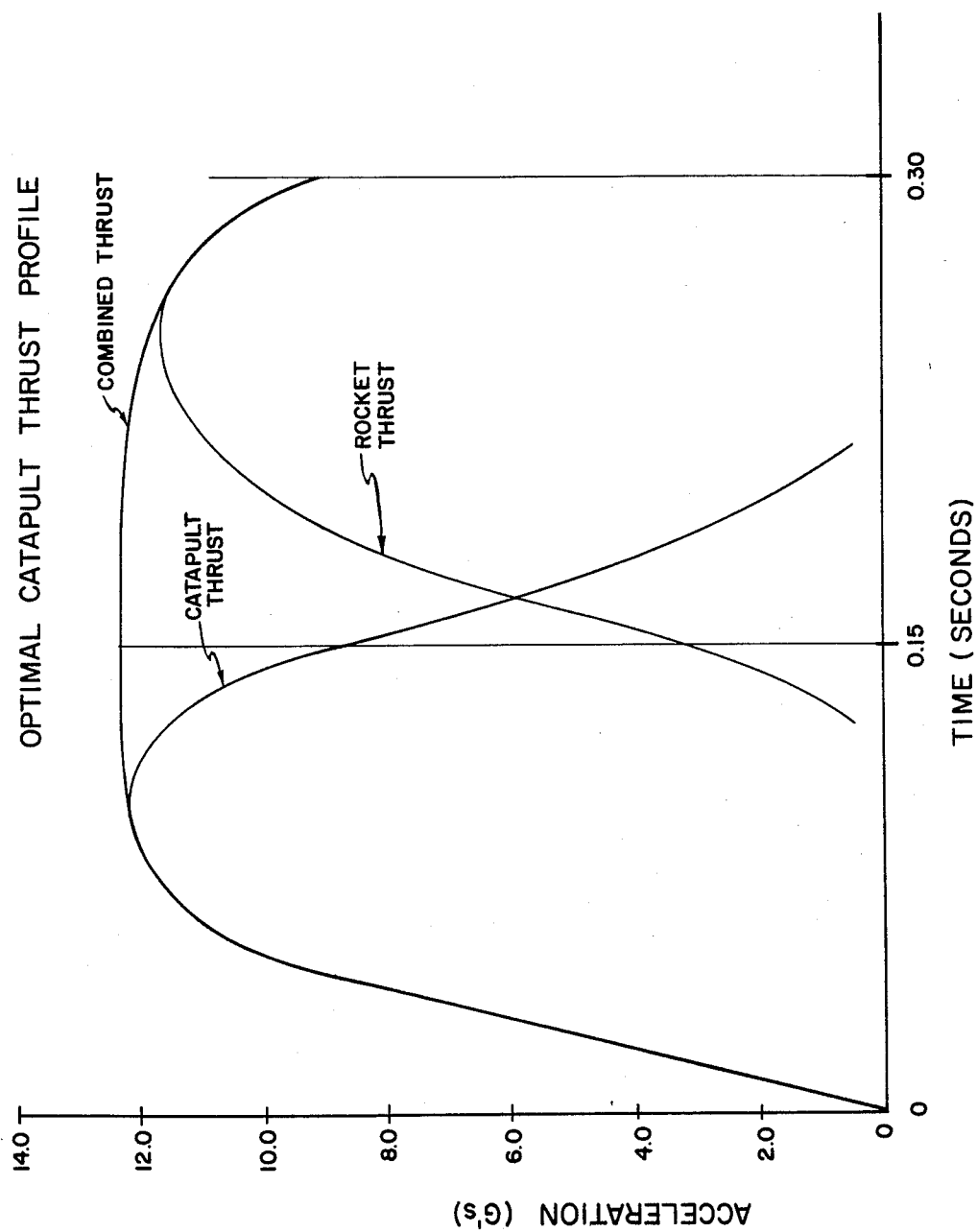

PROGRAMMABLE EJECTION SEAT SYSTEM

BACKGROUND OF THE INVENTION

This invention relates generally to an ejection system and method for emergency crewmember aircraft separation. The ejection system takes into account such parameters as crewmember-seat mass, flight dynamics at the time of ejection, and ambient conditions, to insure a safe ejection for the individual crewmember.

Since the introduction of ejection seats in operational aircraft, there have been performance limitations on the equipment. An area of principal concern is the initial phase of emergency egress from the cockpit. Early attempts considered compression springs, compressed air, or an explosive charge. These efforts recognized the effects of rate of onset acceleration which is commonly referred to as "jolt". The use of an explosive charge was selected for ejection since such systems provided some control regarding peak G's and rate of onset.

Although performance has been improved and the hardware refined in recent years, an explosive charge remains the principal means of egress from the cockpit. With the improved performance and maneuverability of modern high speed aircraft, explosive charge ejection systems may exceed human tolerances depending upon the environmental and flight conditions existing at the time of ejection.

From the standpoint of human tolerance to vertical acceleration, an important factor in rocket design is the control of the rate of burning of the powder in the charge. This determines the rate of build-up of tube pressure which, in turn, determines the rate of onset acceleration. Further, the peak pressure generated in the tube by the burning of the powder produces the peak G. A peak of 20 G's at a rate of onset of 250 G's per second for a duration not to exceed 0.1 second is considered within the safe region of human tolerance. However, traditional systems cannot compensate for changing environmental conditions. For example, the surrounding G field is additive to peak G's. A catapult that applies 18 G's of acceleration to a crewmember at ground conditions will essentially apply 23 G's to the crewmember's spine when the aircraft is under a 5 G environment at the time of ejection. Another changing condition involves the need to consider the variation of ejected mass due to the increasingly diverse pilot population. Initial design catapult requirements consider only the nominal crewmember weight. Very heavy or light crewmembers will produce different peak G's and rates of onset.

Several patents involve sophisticated systems, designed to improve ejection safety. U.S. Pat. No. 2,996,272 discloses an apparatus for ejecting crewmembers from high speed aircraft. A constant thrust type rocket using solid fuel controls ejection thrust. Thrust is automatically varied by thrust vanes carried by the rocket and located at the rocket nozzle.

U.S. Pat. No. 3,027,125 discloses a piston type propelling system in which many charges spaced along the outer tube of the piston are successively unported as the piston moves down the tube. A gun type catapult provides thrust until the ejection seat leaves the cockpit. The rocket motor then fires and provides additional upward velocity.

The performance curves of current catapult systems involve a spike peak pressure and peak G, with the parameters decaying until tube separation. Depending upon the ejected weight this fluctuation can result in a loss of 20 to 25 feet of altitude, which in a low level ejection can be critical. With a rocket catapult the only way to compensate for this loss is to increase the initial ejection force. However, this results in increased pressure, peak G's, and rate-of-onset that will place the small crewmember in a position of exceeding tolerance limits for spinal loading.

The novel features which are believed to be characteristic of the invention, both as to the catapult ejection system and method, together with further objects and advantages thereof, will be better understood from the following description in connection with the accompanying drawing in which presently preferred embodiments of the invention are illustrated by way of examples. It is to be expressly understood, however, that the drawing is for purposes of illustration and description only, and is not intended as a definition of the limits of the invention.

SUMMARY OF THE INVENTION

It is an object of the present invention to provide an improved ejection seat system that automatically compensates for flight dynamics, crewmember mass, and ambient conditions.

It is another object of the present invention to improve the safety of aircraft ejections, to insure that the physical limits of the individual crewmember are not exceeded.

It is yet another object of the present invention to provide a programmable ejection seat system that controls acceleration onset rate and ejection thrust that the crewmember is subjected to during emergency separation from a disabled aircraft as a function of variable sensed parameters.

It is still another object of the present invention to provide an ejection seat system that minimizes rocket jolt to the crewmember.

Briefly, this improved system for ejecting a crewmember from an aircraft uses a rocket catapult and a hydraulic catapult. The hydraulic catapult initiates ejection and provides a controlled ejection force throughout the ejector stroke. The use of hydraulic power provides a more predictable and repeatable ejection force than is possible with explosives.

An ejection processor monitors sensor inputs (crewmember-seat mass, flight dynamics, ambient conditions) that are needed to determine ejector output. The only manual input required is the initiation command. After initiation, the processor takes into account these sensor inputs and selects the performance requirements for the controllable catapult, the rocket phase, and the complete timing sequence.

The hydraulic ejector includes a programmable valve, hydraulic power supply, a rechargeable accumulator, and a two-position valve. The accumulator is able to store very high pressures and release the stored energy upon demand. The two-position valve is opened upon crewmember initiation. The programmable valve receives a signal from the processor, which in response adjusts the fluid flow to the ejector. The ejector is similar to the unit described in U.S. Pat. No. 4,399,968 to W. H. Stock and B. C. Holland entitled "Controlled Output Force Activator," which is hereby incorporated into this specification by reference. The ejector thrust can be adjusted by the programmable valve to compensate for varying conditions and provide controlled forces throughout the ejector stroke. The ejection force is safely within the tolerance of the individual crewmember. After the crewmember has been ejected from the aircraft by the catapult ejector, a rocket is engaged that works in conjunction with the catapult ejector to complete crewmember aircraft separation while minimizing a second jolt to the crewmember. dr

BRIEF DESCRIPTION OF THE DRAWINGS

FIG. 3 is a graph showing acceleration plotted against time for an ejection seat system according to the present invention.

DETAILED DESCRIPTION OF THE INVENTION

Figure 1:
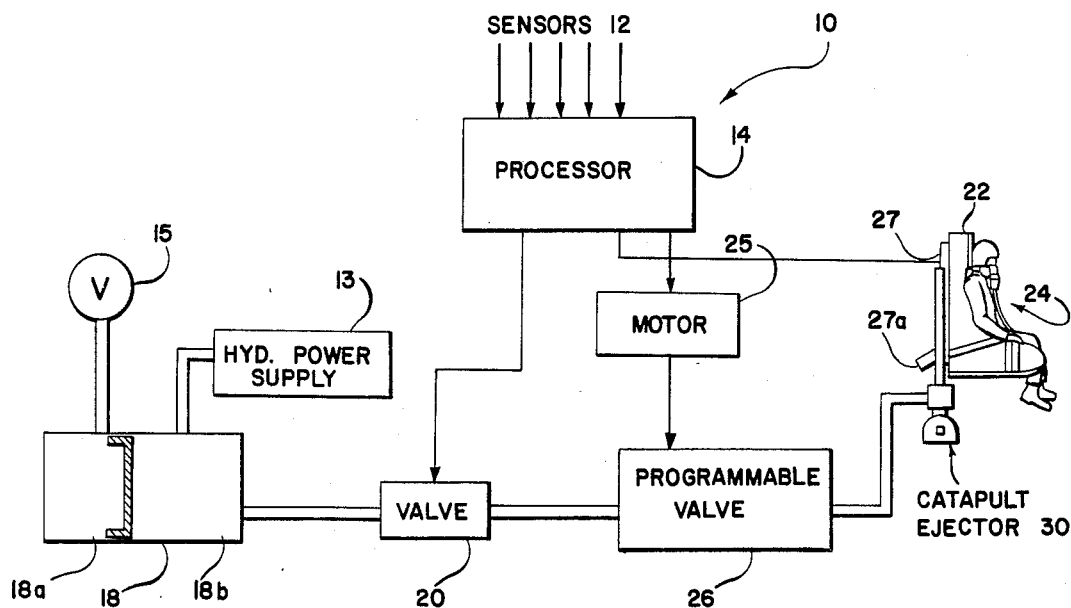
FIG. 1 is a schematic representation of a preferred embodiment of the ejection seat system.

Referring now to the drawings, the ejection seat system generally indicated at 10 is shown in FIG. 1. Sensors 12 measure variables that affect the ejection profile for the individual crewmember. These variables include:

1. fight dynamics such as aircraft position, course, acceleration, airspeed, and maneuver of the aircraft just prior to crewmember ejection;
2. crewmember mass, center of gravity, and ejection seat mass; and
3. ambient conditions such as outside temperature, pressure, humidity, altitude, attitude air density, and windspeed.

Processor 14 is a device that receives inputs from sensors 12 and utilizes a specially designed algorithm to generate performance requirements for the catapult, the rocket, and the timing sequence. Processor 14 may be the central flight computer used to assist the pilot in navigating the aircraft or it may be a separate unit with separate sensors.

The ejector system 10 utilizes a hydraulic catapult ejector 30 and rocket 27 (which has a nozzle 27a). The ejector 30 has a hydraulic system comprising a power supply 13, accumulator 18, a two-position flow control valve 20, pressurization valve 15, and programmable control valve 26. Use of the high pressure accumulator 18 for system fluid supply is desirable because it is compact, is able to store very high pressures, and rapidly releases the stored energy that is required for seat/crewmember ejection. The accumulator pressure varies from 8000 psi to 5000 psi. Accumulator 18 is pressurized on side 18a with nitrogen gas through valve 15. It is charged on the fluid side 18b by hydraulic fluid from supply 13.

Although the initial operating pressure is great, the supply pressure drops rapidly as the hydraulic fluid leaves accumulator 18. The use of this high pressure operating level enables high ejection forces to be developed with much smaller catapult piston areas, resulting in much lower fluid flow rates, and smaller supply lines and control valving than would otherwise be possible using a conventional 3000 psi system. The magnitude of the pressure decay is a function of the volume of hydraulic fluid required by the catapult and the volume and nitrogen precharge pressure of the accumulator. Without the present controlled force catapult, catapult forces will vary directly with the accumulator pressure (less line pressure drop), starting out high and rapidly falling as the ejector extends.

Two-position valve 20 supplies fluid to programmable valve 26 and catapult ejector 30. During operation, valve 20 is energized and rapidly opens to route fluid through valve 26 into ejector 30. The orifice management in the catapult 30 severely restricts initial flow. As the piston strokes, the orifice area increases until maximum flow is attained. Accumulator 18 together with valve 20 is preferably a combined unit designated as part number 3329350—solenoid valve/accumulator, rated at 8000 PSI hydraulic, and is available from Bendix Corporation Electrodynamics Division in North Hollywood, Calif.

Programmable valve 26 can be a separate unit designed to meter on a selectively variable basis the quantity of fluid to ejector 30 or be included in the ejector itself as described in U.S. Pat. No. 4,399,968.

Figures 2A, 2B, 2C, 2D:
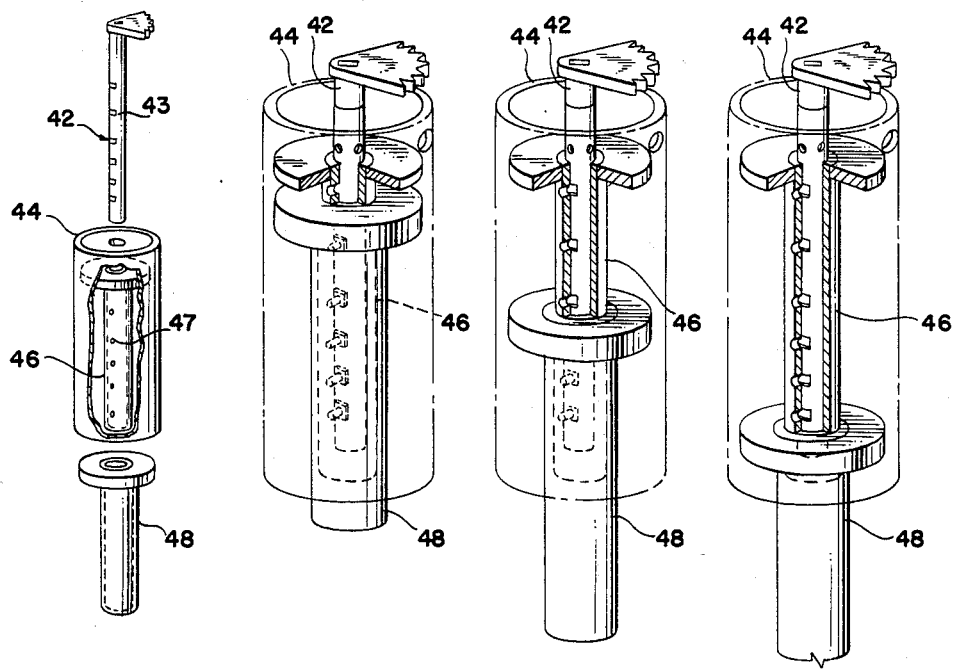
FIGS. 2A through 2D are a series of perspective drawings of the hydraulic catapult ejector used in the present invention.

Catapult ejector 30 utilized in the system is also generally described in U.S. Pat. No. 4,399,968 referenced above and provides a controlled force profile during the cylinder stroke such that a selected rate of onset acceleration and maximum thrust result through the use of an orifice management which increases orifice area as the catapult cylinder strokes (see FIG. 2). Catapult ejector 30 essentially includes cylinder housing 44, first tubular member 46 having a first array of orifices 47, and sliding piston 48 (see FIG. 2A). As piston 48 moves within housing 44 and during the ejection stroke (downward as illustrated in FIG. 2), more orifices are uncovered which maintain a selected hydraulic pressure on piston 48 which results in an appropriate rate of onset acceleration and ejection force. During ejection, the hydraulic fluid passes into the hollow portion of tubular member 46, and through the first array of orifices 47 and into the area above piston 48, causing piston 48 to stroke and eject the seat 22.

In the preferred embodiment, programmable valve 26 is incorporated into ejector 30. Valve 26 includes a second tubular member 42 having a second array of orifices 43. Member 42 is mounted for rotation within the bore of member 46. The second array of orifices are in a preferably one-to-one relationship with the first array and are designed to overlap the first array. First tubular member 42 is rotated within second tubular member 46 by motor 25 to regulate the ejection force profile by varying the amount of overlap of the first and second array of orifices. Thus, by varying the overlap by selectively rotating member 42 relative to member 46, the ejection force vs stroke profile can be changed to accomodate changes in ejection conditions and crewmember mass. This is accomplished by processor 14 in response to sensors 12 transmitting a signal or signals to motor 25 which rotates member 42 as required.

For crewmember ejection the ejector stroke varies from 36 to 40 inches, which is considerably larger than the 4 inch stroke required to eject stores. The ejector stroke is a function of seat 22 and crewmember 24 mass, maximum allowable reaction force, and minimum operating pressure. The variable flow is based on the changing piston velocity required to produce the desired onset acceleration rate and maximum acceleration. The number and size of each orifice determines the smoothness of the output force. The larger the number of orifices, the smoother the output force. FIG. 2B shows the ejector at the beginning of the stroke, FIG. 2C at midstroke position, and FIG. 2D at the end of the stroke.

Referring now to FIG. 3, as the rate of acceleration of the hydraulic catapult ejection phase starts to decay (or at the maximum acceleration), the rocket phase of the ejection seat system is initiated by firing rocket 27. Timing of the rocket actuation is preferably determined by processor 14 which transmits a corresponding actuation signal to rocket 27. This can be prior to or simultaneous with the actuation signal to ejector 30, i.e., rocket actuation can be a fixed time after the actuation signal is received or be a function of magnitude of the signal. The two phase ejection system operation will minimize the change in the acceleration rate as crewmember separation is completed, whereby a second jolt to the crewmember is substantially avoided. Rocket burnout occurs at about 0.30 seconds after ejection initiation. The rocket firing occurs sometime after the crewmember has vacated the cockpit, and also insures that the crewmember does not collide with the disabled aircraft. The rocket may also have a controllable burning rate, whereby sensors are used to monitor acceleration and acceleration change, the explosion being part of a closed control loop, and the resulting burning rate minimizing change in acceleration. Alternately, this could be predetermined by processor 14 and transmitted to rocket 27 with the actuation signal.

The basic ejection envelope criteria for the escape system is:
  Maximum dynamic pressure of 1600 pounds per square foot
  Maximum altitude of 50,000 feet
  Speed of 0 to 685 keas.
The crewmember's personal gear, such as helmet and oxygen system, must be designed to be compatible with the escape system and be operational within this same envelope.

Accordingly, there has been provided, in accordance with the invention, a programmable ejection seat system that fully satisfies the objectives set forth above. It is understood that all terms used herein are descriptive rather than limiting. While the invention has been described in conjunction with specific embodiments, it is evident that many alternatives, modifications, and variations will be apparent to those skilled in the art in light of the disclosure herein. Accordingly, it is intended to include all such alternatives, modifications, and variations that fall within the spirit and scope of the appended claims.

What is claimed is:

1. A system for ejecting a crewmember from an aircraft comprising:
   an ejection seat for the crewmember;
   sensing means for sensing selected parameters that may affect ejection of the crewmember;
   processing means responsive to said sensing means for computing and generating a force signal, said force signal being a variable which is computed as a function of said sensed parameters, said force signal corresponding to an ejection force profile for said ejection seat which is within human safety tolerances for the crew member at the time of initiation of ejection; and catapult
   ejector means for ejecting said ejection seat from the aircraft, said ejector means generating an ejection force with a variable magnitude being responsive to said force signal such that ejection of said ejection seat is in a specialized manner based upon the nature of said force signal.

2. The system of claim 1 wherein said ejector means comprises a source of pressurized fluid, a cylinder, a piston assembly adapted to engage and eject said ejection seat, said piston assembly slidably mounted within said cylinder, said piston assembly being movable within said cylinder by said pressurized fluid from a first position to a second position for ejecting said ejection seat, said first and second positions defining the stroke of said piston assembly, said piston assembly moving from said first position to said second position when ejecting said ejection seat with a force versus stroke profile dependent upon said force signal.

3. The system of claim 2 wherein said force versus stroke profile results in a selected maximum ejection thrust on the crewmember that takes into consideration the sensed parameters.

4. The system of claim 2 wherein said pressurized fluid flows into said cylinder to cause said piston assembly to move from said first position to said second position and said catapult ejector means also includes a programmable valve that adjusts flow of said pressurized fluid into said cylinder in response to said force signal such that said force versus stroke profile is obtained.

5. The system of claim 3 wherein said pressurized fluid flows into said cylinder to cause said piston assembly to move from said first position to said second position and said catapult ejector means also includes a programmable valve that adjusts flow of said pressurized fluid into said cylinder in response to said force signal such that said force versus stroke profile is obtained.

6. The system of claim 4 also including rocket means connected to said ejection seat for providing, in combination with said ejector means, ejection thrust to said ejection seat during ejection thereof.

7. The system of claim 6 wherein the thrust provided to said ejection seat by said rocket means is initiated approximately when said ejection seat has reached a peak acceleration during ejection.

8. The system of claim 7 wherein said rocket means combines with said ejector means to provide a substantially constant acceleration to said crewmember for a period of time necessary to assure safe separation from the aircraft.

9. The system of claim 8 wherein said substantially constant acceleration is approximately the peak acceleration reached during the ejection.

10. The system of claim 6 wherein jolt to the crewmember as a result of thrust from said rocket means is substantially reduced.

11. The system of claim 7 wherein jolt to the crewmember as a result of thrust from said rocket means is substantially reduced.

12. The system of claim 8 wherein jolt to the crewmember as a result of thrust from said rocket means is substantially reduced.

13. The system of claim 9 wherein jolt to the crewmember as a result of thrust from said rocket means is substantially reduced.

14. The system of claim 8 wherein said period of time is at least 0.075 seconds.

15. The system of claim 9 wherein said period of time is at least 0.075 seconds.

16. The system of claim 4 wherein said ejector means provides a substantially uniform acceleration rate after initiation of ejection until an acceleration greater than about 80% of the peak ejection acceleration is acheived.

17. The system of claim 16 wherein said substantially uniform acceleration rate is less than 250 G's/second.

18. The system of claim 7 wherein said peak acceleration is less than 20 G's.

19. The system of claim 9 wherein said peak acceleration is less than 20 G's.

20. The system of claim 1 wherein said parameters include mass of the crewmember.

21. The system of claim 20 wherein said parameters include flight dynamics at the time of ejection.

22. The system of claim 21 wherein said parameters include ambient conditions.

23. The system of claim 6 wherein said parameters include mass of the crewmember.

24. The system of claim 6 wherein said parameters include flight dynamics at the time of ejection.

25. The system of claim 6 wherein said parameters include ambient conditions.

26. The system of claim 23 wherein said parameters include ambient conditions and flight dynamics at the time of ejection.

27. The system of claim 7 wherein said processing means generates an actuation signal, and said rocket means is responsive to said actuation signal for initiating thrust which said rocket means provides to said ejection seat.

* * * * *